United States Patent
Johnson et al.

(10) Patent No.: US 11,916,362 B2
(45) Date of Patent: Feb. 27, 2024

(54) EXPANSION FITTING FOR CABLE TRAY

(71) Applicant: Eaton Intelligent Power Limited, Dublin (IE)

(72) Inventors: Jacob L. Johnson, New Baden, IL (US); Todd Brasher, St. Louis, MO (US); Brandon M. Tally, Greenville, IL (US)

(73) Assignee: EATON INTELLIGENT POWER LIMITED, Dublin (IE)

( * ) Notice: Subject to any disclaimer, the term of this patent is extended or adjusted under 35 U.S.C. 154(b) by 16 days.

(21) Appl. No.: 17/717,608

(22) Filed: Apr. 11, 2022

(65) Prior Publication Data
US 2022/0329054 A1    Oct. 13, 2022

Related U.S. Application Data

(60) Provisional application No. 63/172,797, filed on Apr. 9, 2021.

(51) Int. Cl.
*H02G 3/06* (2006.01)
*H02G 3/04* (2006.01)

(52) U.S. Cl.
CPC ......... *H02G 3/0608* (2013.01); *H02G 3/0456* (2013.01)

(58) Field of Classification Search
CPC ........................ H02G 3/0608; H02G 3/0456
See application file for complete search history.

(56) References Cited

U.S. PATENT DOCUMENTS

| | | | | |
|---|---|---|---|---|
| 3,173,521 A * | 3/1965 | Gross | ..................... | H01R 31/00 403/169 |
| 6,768,050 B2 * | 7/2004 | Lockard | ............... | H02G 3/0608 174/113 C |
| 7,332,675 B2 * | 2/2008 | Galasso | ............... | H02G 3/0608 174/101 |
| 7,344,163 B2 * | 3/2008 | Thompson | ........... | H02G 3/0608 138/155 |

(Continued)

FOREIGN PATENT DOCUMENTS

KR          101779741 B1 *  9/2017

OTHER PUBLICATIONS

Translation of KR-101779741 (Year: 2017).*

*Primary Examiner* — Monica E Millner
(74) *Attorney, Agent, or Firm* — Stinson LLP

(57) ABSTRACT

The present disclosure provides a cable tray fitting with tray connector and a flexible membrane with opposite longitudinal ends. The tray connectors are secured to the opposite longitudinal with each being secured to one of a pair of adjacent cable tray sections. The flexible membrane allows relative movement between the cable tray sections. The disclosure provides a cable tray assembly including first and second cable tray sections each with a longitudinal end. The cable tray assembly includes a cable tray fitting secured to and disposed between the longitudinal ends of the first and second cable tray sections. The disclosure provides a method of assembling a cable tray assembly by securing a cable tray fitting to opposing and adjacent longitudinal ends of first and second cable tray sections and allowing the cable tray sections to move in three dimensions relative to one another by virtue of the flexible membrane.

16 Claims, 3 Drawing Sheets

(56) References Cited

U.S. PATENT DOCUMENTS

| | | | | |
|---|---|---|---|---|
| 8,459,604 B2* | 6/2013 | Smith | ............... | H02G 3/0608 |
| | | | | 248/57 |
| 9,209,609 B2* | 12/2015 | Kellerman | ............ | E04B 1/5812 |
| 9,850,707 B2* | 12/2017 | Wesgardh | ............ | H02G 3/0608 |
| 2010/0258686 A1* | 10/2010 | Sutton | ............... | H02G 3/0608 |
| | | | | 248/73 |

* cited by examiner

EXPANSION FITTING FOR CABLE TRAY

FIELD OF THE DISCLOSURE

The present disclosure generally relates to an expansion fitting for a cable tray configured to join to cable tray sections to one another and allow for relative movement therebetween.

BACKGROUND OF THE DISCLOSURE

Ladder-type cable tray is used by industry to support electrical cable, for example. A length or section of ladder cable tray comprises a pair of side rails connected by cable-supporting rungs extending between the rails at intervals along the tray. Typically, cable tray sections are spliced together using splice plates to form a cable tray assembly.

DETAILED DESCRIPTION OF THE DISCLOSURE

Figure 1:
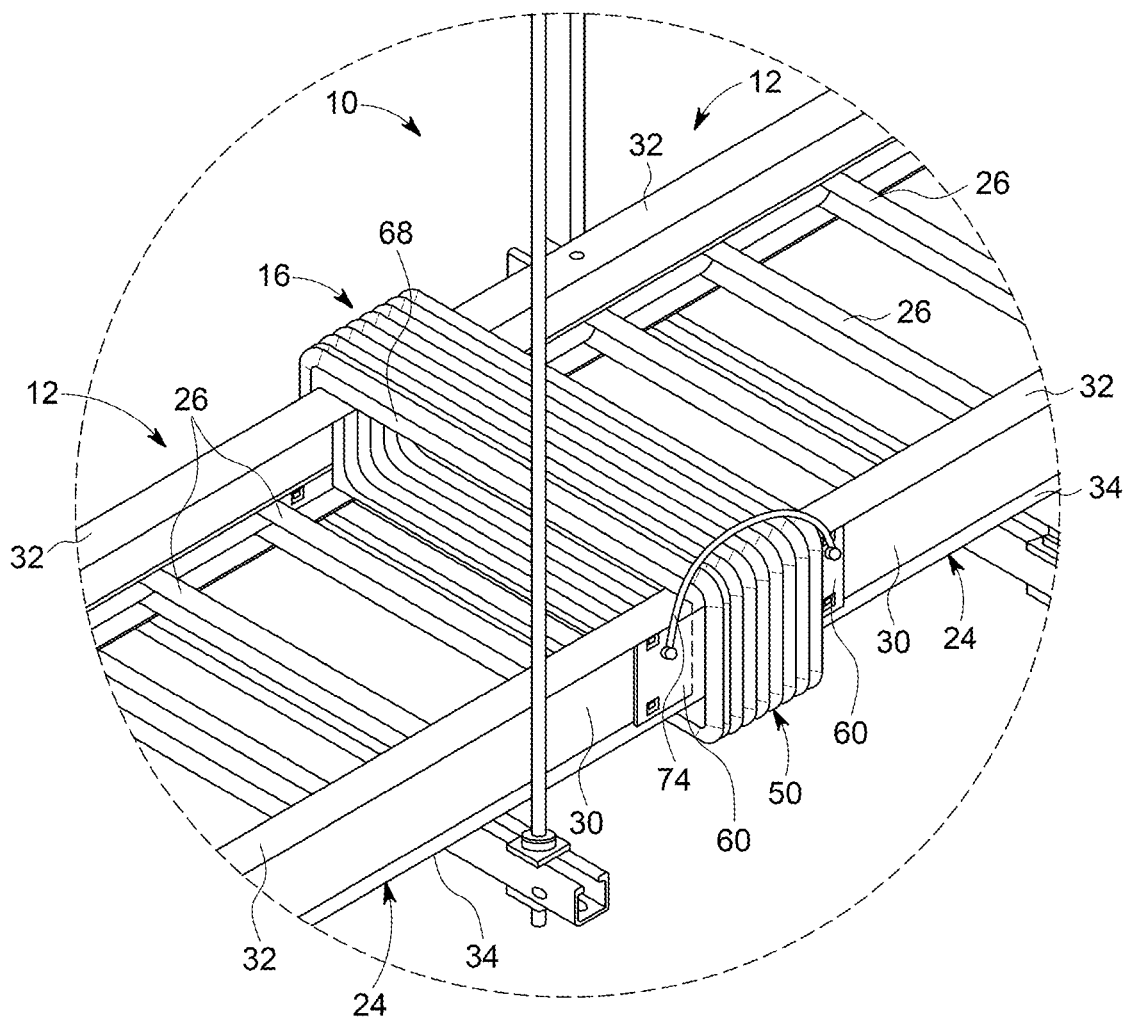
FIG. 1 is a perspective of two cable tray sections secured to one another by an expansion fitting of the present disclosure.
Figure 2:
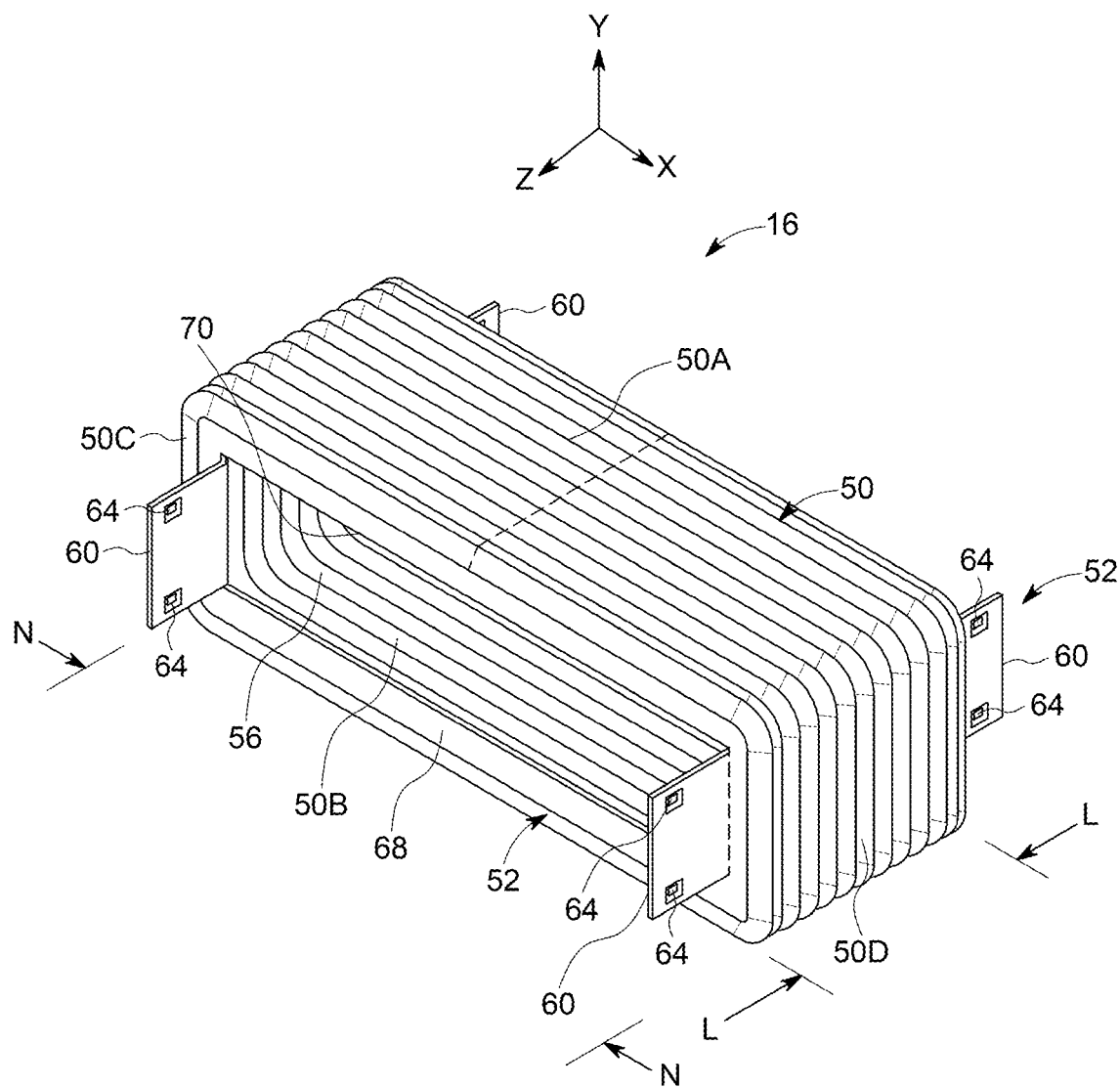
FIG. 2 is an enlarged perspective of the expansion fitting.
Figure 3:
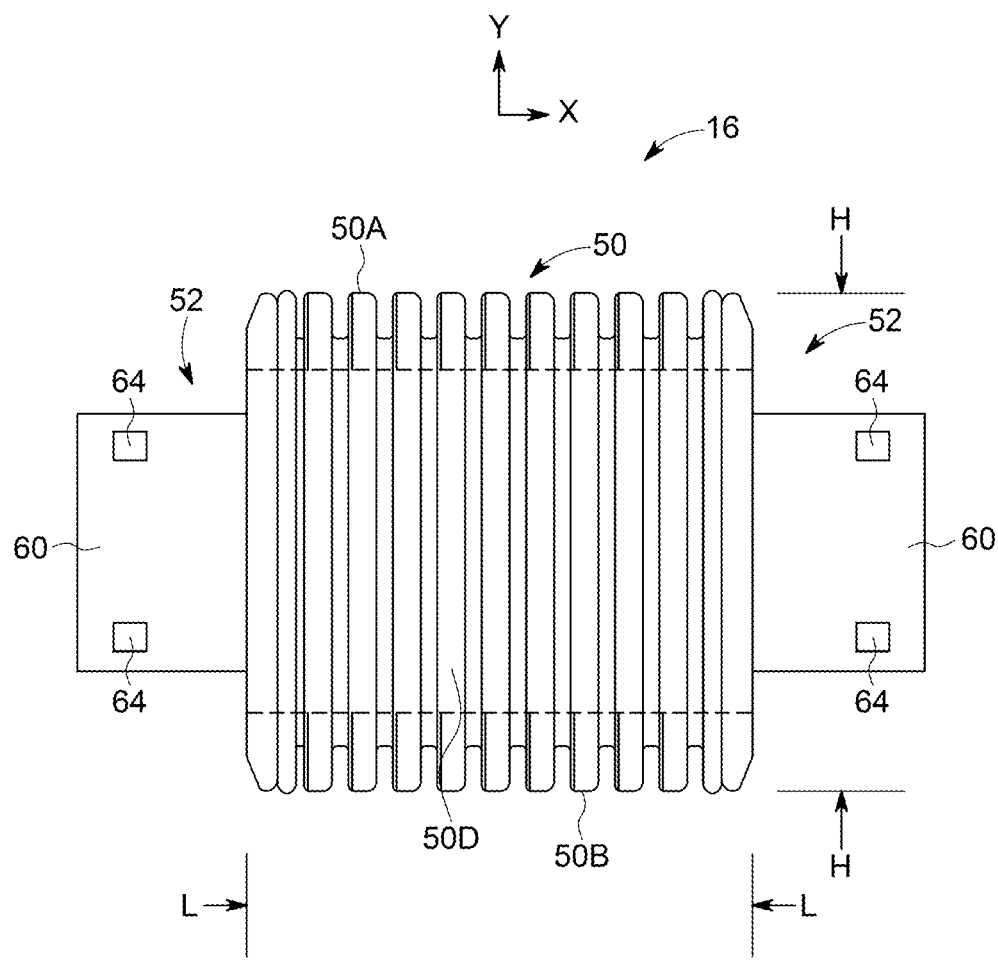
FIG. 3 is a side elevation of the expansion fitting.

Referring now to the drawings, and in particular to FIG. 1, a cable tray assembly constructed according to the teachings of the present disclosure is generally indicated at reference numeral 10. The cable tray assembly 10 includes at least one cable tray section, e.g., two cable tray sections each generally indicated at 12, and at least one expansion cable tray fitting, generally indicated at 16, connected to each cable tray section. The cable tray fitting 16 is used to connect (e.g., splice) the longitudinal ends of adjacent cable tray sections 12 together. As used herein, terms denoting relative locations and positions of components and structures, including but not limited to "upper," "lower," "left," "right," "front," and "rear," are in reference to the cable tray assembly 10 and the respective components in the horizontal orientation, as shown in FIG. 1. It is understood that these terms are used for ease of description and not meant in a limiting sense. It is understood that the cable tray assembly 10 may be in a vertical orientation in the field, whereby the relative locations and positions of the components and structures would be different than as shown in the drawings. As used herein, the term "inboard" means toward or in the interior of the cable tray section 12 and/or cable tray assembly 10. As used herein, the term "outboard" means away from the interior or at the exterior of the cable tray section 12 and/or cable tray assembly 10.

Referring still to FIG. 1, each illustrated cable tray section 12 includes two side rails, generally indicated at 24, (e.g., straight parallel rails) forming the sides of the cable tray section, and a plurality of cable-supporting rungs 26 extending between the rails 24 at intervals spaced lengthwise of the section. It is understood that in one or more embodiments, the rails 24 may curved rather than straight or may have other shapes. Each rail 24 has a generally I-shaped cross section or profile, broadly a first cross-sectional shape (e.g., an I-shaped beam). Each rail 24 may have other cross-sectional shapes. Each illustrated rail 24 comprises a generally vertical web 30, an upper generally horizontal flange 32 at the upper end of the web having inboard and outboard portions relative to the vertical web, and a lower generally horizontal flange 34 at the lower end of the web having inboard and outboard portions relative to the vertical web. The rungs 26 are secured or fixed (e.g., by welding or with fasteners) to the inboard portions of the lower flanges 34. Each rail 24 has opposite longitudinal ends and a length extending therebetween, which generally corresponds to the length of the cable tray section 12. The length of each manufactured cable tray section 12 may also vary (e.g., from 10-30 feet). The cable tray sections 12 are often cut to fit in the field to varying lengths.

The expansion cable tray fitting 16 includes a flexible membrane, generally indicated at 50, having opposite longitudinal ends, and a pair of tray connectors, each indicated generally at 52, secured to the opposite longitudinal ends of the flexible membrane. The cable tray fitting 16 provides relative movement between the adjacent cable tray sections 12, such as during a seismic event. In one example, the cable tray fitting 16 allows three-dimensional movement in a direction perpendicular to the cable tray assembly (e.g., x-direction as illustrated), a direction parallel to the tray assembly (e.g., z-direction as illustrated), and a vertical direction (e.g., y-direction as illustrated). In one specific example, the cable tray fitting 16 allows for about 4 in of movement perpendicular to the cable tray assembly (e.g., x-direction as illustrated), about 4 in of movement parallel to the tray assembly (e.g., z-direction as illustrated), and about 2 in of movement in a vertical direction (e.g., y-direction as illustrated).

The flexible membrane 50 includes opposite top and bottom walls 50A, 50B, and opposite side walls 50C, 50D. The flexible membrane 50 has a length extending between its opposite longitudinal ends (z-direction), a width extending between its opposite side walls (x-direction), and a height extending between the top and bottom walls (y-direction). In the illustrated embodiment, the top wall 50A, the bottom wall 50B, and the side walls 50C, 50D are corrugated to allow longitudinal expansion of the flexible membrane 50 and relative displacement of the opposite longitudinal ends in the lateral and vertical directions (x- and y-directions). In other embodiments, the flexible membrane 50 may not be corrugated while still allowing for longitudinal expansion and the movements in the lateral and vertical directions. In one example, the flexible membrane 50 may be resiliently flexible and biased to the configuration shown in the drawings, wherein the opposite longitudinal ends are aligned. In one example, the flexible membrane 50 may comprise (e.g., be formed from) closed cell sponge rubber or other rubber or a thermoplastic elastomer, for example.

Each tray connector 52 is secured to the flexible membrane 50 adjacent corresponding one of the longitudinal ends of the flexible membrane. For example, each tray connector 52 may be secured within the longitudinal opening 56 of the flexible membrane 50. Each illustrated tray connector 52 includes at least one coupling plate, each indicated at 60, extending longitudinally outward from the corresponding one of the longitudinal ends of the flexible membrane 50 adjacent one of the side walls 50C, 50D. There are four coupling plates 60 in the illustrated embodiment, one for each rail 24 of the adjacent cable tray sections 12. Each coupling plate 60 is configured to be fastened to one of the rails 24 of the corresponding cable tray section 12. As an example, each coupling plate 60 is configured to overlie an outboard side of the web 30 of the corresponding cable tray section 12. The coupling plate 60 may define at least one fastener opening 64 configured to receive a fastener (e.g., a bolt or screw; not shown) that is further inserted through the rail 24 to secure the coupling plate to the rail of the cable tray section 12.

In the illustrated embodiment, each tray connector 52 includes two opposing coupling plates 60 connected to a generally rectangular frame 68. The rectangular frame 68 is connected to the corresponding one of the longitudinal ends of the flexible membrane 50, such that a window 70 defined by the frame is in registration with the longitudinal opening 56 of the flexible membrane. In one example, the tray connector 52 comprises (e.g., is formed from) metal, such as aluminum. Other ways of securing tray connectors, such as coupling plates, to the flexible membrane are possible.

As shown in FIG. 1, the flexible membrane 50 is disposed between the adjacent longitudinal ends of the cable tray sections 12 when the expansion cable tray fitting 16 is secured to the cable tray sections. As installed, the windows 70 defined by the frames 68 of the tray connectors 52 and the longitudinal opening 56 defined by the flexible membrane 50 allow cable to run through (and be enclosed by) the expansion cable fitting between the cable tray sections. In one example, one or more bonding jumpers 74 (FIG. 1) may be secured to and extend between opposite tray connectors 52 (e.g., plates 60) on the adjacent cable tray sections 12 to electrically connect the cable tray sections. Other ways of electrically connecting the cable tray sections are possible.

In one embodiment, the expansion cable tray fitting 16 is installed along a cable run and between the two cable tray sections 12 at an expansion joint of a building. Buildings in seismic zones are built with expansion joints to release stress during seismic events. When a cable tray comes across a seismic junction, the installer is left with two options: 1) leave a gap at the expansion junction to allow the cable to move, but comes with the drawback of exposing their cables to the environment; and 2) run the cable tray as normal, but risk damage to the tray and to the cable as the building moves. Using the expansion cable fitting 16 described herein, the expansion cable fitting straddles the seismic junction and allows the cable tray sections 12 to move relative to one another and with the building sections while protecting the cables contained within the cable tray.

Modifications and variations of the disclosed embodiments are possible without departing from the scope of the invention defined in the appended claims.

When introducing elements of the present invention or the embodiment(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above constructions, products, and methods without departing from the scope of the invention, it is intended that all matter contained in the above description and shown in the accompanying drawings shall be interpreted as illustrative and not in a limiting sense.

What is claimed is:

1. A cable tray fitting comprising:
a flexible membrane having opposite longitudinal ends and defining an opening extending through the longitudinal ends; and
tray connectors secured to the opposite longitudinal ends of the flexible membrane, wherein each tray connector is configured to be secured to one of a pair of adjacent cable tray sections to couple the expansion cable tray fitting between the pair of adjacent cable tray sections,
wherein the flexible membrane is configured to allow relative movement between the pair of adjacent cable tray sections in three dimensions when the expansion cable tray fitting is coupled to the pair of adjacent cable tray sections,
wherein the opening of the flexible membrane is configured to receive at least one cable to run through the flexible membrane between the pair of adjacent cable tray sections.

2. A cable tray assembly comprising:
a first cable tray section having a longitudinal end;
a second cable tray section having a longitudinal end generally opposing and adjacent to the longitudinal end of the first cable tray; and
a cable tray fitting secured to and disposed between the longitudinal ends of the first and second cable tray sections,
wherein the cable tray fitting includes a flexible membrane having opposite longitudinal ends and defining an opening extending through the longitudinal ends,
wherein the opening of the flexible membrane is configured to receive at least one cable to run through the flexible membrane between the first and second cable tray sections, and
wherein the flexible membrane is configured to allow relative movement between the first and second cable tray sections in three dimensions.

3. A method of assembling a cable tray assembly comprising:
securing a cable tray fitting to opposing and adjacent longitudinal ends of first and second cable tray sections so that the cable tray fitting is disposed between the first and second cable tray sections, wherein the cable tray fitting includes a flexible membrane, wherein securing the securing the cable tray fitting comprises securing the flexible membrane of the cable tray fitting between the first and second cable tray sections such that the flexible membrane longitudinally extends between the first and second cable tray sections, wherein the flexible membrane defines a longitudinal opening configured to receive cables therethrough; and
enabling the first and second cable tray sections to move in three dimensions relative to one another by virtue of the flexible membrane.

4. The cable tray fitting of claim 1, wherein the flexible membrane comprises corrugated walls to allow longitudinal expansion of the flexible membrane.

5. The cable tray fitting of claim 1, wherein the flexible membrane comprises closed cell foam rubber.

6. The cable tray fitting of claim 1, wherein the tray connectors comprise coupling plates extending longitudinally from the longitudinal ends of the flexible membrane and configured to secure the flexible membrane to the pair of adjacent cable tray sections.

7. The cable tray fitting of claim 6, wherein the tray connectors further comprise rectangular frames, wherein the rectangular frames define windows in registration with the opening of the flexible membrane.

8. The cable tray assembly of claim 2, wherein the cable tray fitting comprises tray connectors secured to the opposite longitudinal ends of the flexible membrane, wherein each tray connector is secured to one of the first and second cable tray sections to couple the cable tray fitting between the first and second cable tray sections.

9. The cable tray fitting of claim 8, wherein the tray connectors comprise coupling plates extending longitudinally from the longitudinal ends of the flexible membrane and configured to secure the cable tray fitting the first and second cable tray sections.

10. The cable tray fitting of claim 9, wherein each tray connector comprises a rectangular frame, wherein each of the rectangular frames defines a window in registration with the opening of the flexible membrane.

11. The cable tray fitting of claim 2, wherein the flexible membrane comprises corrugated walls to allow longitudinal expansion of the flexible membrane.

12. The cable tray fitting of claim 2, wherein each of the first and second cable tray sections comprises at least one side rail configured to be coupled to the cable tray fitting.

13. The cable tray fitting of claim 12, wherein the cable tray fitting comprises coupling plates extending longitudinally from longitudinal ends of the flexible membrane and configured to secure the cable tray fitting to side rails of the first and second cable tray sections.

14. The method of assembling a cable tray assembly of claim 3, wherein securing the cable tray fitting comprises positioning coupling plates extending longitudinally from the flexible membrane on side walls of the first and second cable tray sections and fastening the coupling plates to the side walls.

15. The method of assembling a cable tray assembly of claim 14, wherein the cable tray fitting comprises opposing frames secured to the flexible membrane, wherein the coupling plates extend from the opposing frames, wherein the opposing frames define windows in registration with the opening of the flexible membrane.

16. The method of assembling a cable tray assembly of claim 15, further comprising running cables through the opening of the flexible membrane and the windows of the of the opposing frames.

* * * * *